(12) United States Patent
Spaenjers et al.

(10) Patent No.: US 6,999,410 B2
(45) Date of Patent: Feb. 14, 2006

(54) APPARATUS FOR THE TRANSMISSION AND/OR RECEPTION OF DATA, AND METHOD FOR CONTROLLING THIS APPARATUS

(75) Inventors: Jan Spaenjers, Wuustwezel (BE); Christiaan Van Der Auwera, Mechelen (BE)

(73) Assignee: Alcatel, Paris (FR)

( * ) Notice: Subject to any disclaimer, the term of this patent is extended or adjusted under 35 U.S.C. 154(b) by 827 days.

(21) Appl. No.: 09/986,687

(22) Filed: Nov. 9, 2001

(65) Prior Publication Data

US 2002/0057681 A1 May 16, 2002

(30) Foreign Application Priority Data

Nov. 10, 2000 (EP) ................................. 00403143

(51) Int. Cl.
*G01R 31/08* (2006.01)
(52) U.S. Cl. ...................................... 370/219; 370/248
(58) Field of Classification Search ........ 370/216–228, 370/241–253, 351, 389
See application file for complete search history.

(56) References Cited

U.S. PATENT DOCUMENTS

| | | | |
|---|---|---|---|
| 5,663,949 A | | 9/1997 | Ishibashi et al. |
| 5,737,338 A | * | 4/1998 | Eguchi et al. ............... 714/716 |
| 5,781,715 A | | 7/1998 | Sheu |
| 6,038,211 A | * | 3/2000 | Lemaire ...................... 370/216 |
| 6,226,111 B1 | * | 5/2001 | Chang et al. ................... 398/9 |
| 6,256,291 B1 | * | 7/2001 | Araki .......................... 370/216 |

FOREIGN PATENT DOCUMENTS

| | | |
|---|---|---|
| DE | 197 37 359 A1 | 3/1999 |
| WO | WO 99/14886 | 3/1999 |
| WO | WO 98/49863 | 11/1999 |

\* cited by examiner

*Primary Examiner*—Huy D. Vu
*Assistant Examiner*—Jason Mattis
(74) *Attorney, Agent, or Firm*—Sughrue Mion, PLLC

(57) ABSTRACT

The invention relates to an apparatus for the transmission and the reception of data comprising:
  a plurality of inputs and a plurality of corresponding outputs for the respective coupling to the incoming part and outgoing part of a plurality of links, wherein, to each input and to each output, is associated a respective switching device ($14_1$, $14_2$, $14_3$, $14_4$),
  for each couple of input and output, an active terminating board ($12_1$) for coupling this input and this output and for further transmitting data,
  at least one spare terminating board ($12_2$) which is able to replace a defective active terminating board,
  each terminating board comprising means ($20_1$) adapted to test the quality of the link (W) to which it is associated and to compare said quality to a predetermined criterium and to generate a control signal to first control means ($26_1$, $28_1$) of said each terminating board, the first control means being adapted to replace the defective link by another link, if this quality does not comply with the predetermined criterium, and
  second control means ($26_1$, 41) coupled to the active and spare terminating boards adapted to modify the operation of at least one of said switching devices such that in case of failure of an active terminating board, it is replaced by the spare terminating board.

With a structure of this kind, the protection ratio of the links and of the terminating board are selectable independently from each other.

17 Claims, 8 Drawing Sheets

FIG_2

FIG_3

FIG_4

FIG_5

FIG_5a

FIG_7

APPARATUS FOR THE TRANSMISSION AND/OR RECEPTION OF DATA, AND METHOD FOR CONTROLLING THIS APPARATUS

The invention relates to an apparatus for the transmission and/or the reception of data, and more particularly to an apparatus of this kind which comprises protection means.

The transmission of digital data is performed through a great number of switches or routing devices which may be subject to failures. The failures may appear either in the links, i.e. in the wires, which are either electrical or optical, or in equipment such as terminating boards. In the context of the present description a link is a set of two lines, one for the incoming data, the other for the transmitted data. These two lines may be integrated into one single conductor, or may consist of two separate lines, for instance two optical fibres.

Explanation About Link Protection:

Generally, data are transmitted between transmission/reception equipment, such as exchanges, which are switching or routing devices, whereby two equipments are coupled by a plurality of links. A group of N working links are usually associated with one protecting link, in this case the protection is denoted as 1:N. When a failure or degradation is detected in a working link, this corresponding working link is replaced by a protecting link under the control of a protection circuit named "Automatic Protection Switching". According to ITU standard n° G.783, the number of protecting links between 2 transmission/reception equipment may amount to 1 protecting link for a maximum of 15 working links.

After repair of the failed working link, either this repaired link returns to the original state, or this previously working link becomes a protecting link.

A protecting link is normally not completely inactive. It is used to transmit signalling data about the integrity of the working links. These signalling data are, for instance, the K1,K2 bytes of the already mentioned ITU standard.

The protection ratio of the working links is variable. A protection ratio of 1:N means that 1 protecting link is provided for N working links. This ratio may be zero. In that case, no automatic protection mean is provided and the traffic through the failed working link is rerouted over other links routed to the same destination.

Explanation About Board Protection:

At each end of a link is associated a device for transmission and reception of data which is named a "terminating board". In order to protect the transmission system from failures of such boards additional terminating boards are generally provided at each end. The additional board(s), named spare board(s), replace(s) an active board when the latter fails.

The number of spare boards may vary from one equipment to the other. It may be from one spare board for one active board, up to one spare board for seven active terminating boards.

The invention starts from the recognition that in the known equipment, the protection ratio of the working links depends on the protection ratio of the terminating boards. The invention overcomes this drawback and provides an apparatus for transmission and/or reception of digital data which may be designed with a greater degree of freedom, the protection ratios of the links and of the terminating boards being selectable independently from each other.

In order to obtain this result, the apparatus for the transmission and reception of digital data according to the invention comprises:

a plurality of inputs and a plurality of corresponding outputs for the respective coupling to the incoming part and outgoing part of a plurality of links, wherein, to each input and to each output is associated a respective switching device, for each couple of inputs and outputs, an active terminating board for coupling this input and this output and for further transmitting data, at least one spare terminating board which is able to replace a defective active terminating board, each terminating board comprising means for testing the quality of the link to which it is associated and, if this quality does not comply with a predetermined criterium, first control means to replace the defective link by another link, and second control means coupled to the active and spare terminating boards adapted to modify the operation of at least one of said switching devices such that in case of failure of an active terminating board, it is replaced by the spare terminating board.

Remark that throughout this document the term "comprising" should not be interpreted as being limitative to the means listed thereafter. Thus the scope of the expression "a device comprising A and B" should not be limited to devices consisting only of components A and B.

Similarly, it is to be noticed that the term "coupled", also used within this document, should not be interpreted as being limitative to direct connections only. Thus the scope of the expression "a device A coupled to a device B" should not be limited to devices or systems wherein an output of device A is directly connected to an input of device B. It means that there exists a link between an output of A and an input of B, possibly via other devices between A and B.

With the switching device or devices of the invention, the protection ratios of the links and of the terminating boards are selectable independently from each other. In other words, link protection and board protection are orthogonal.

In the preferred embodiment, each switching device comprises a 2×2 switch or a similar switch, such as a 4×4 switch.

The 2×2 switches have each four terminals, wherein one of which is connected to an input or output, another terminal is connected to the input or output of an active terminating board and a third terminal is connected to the corresponding input or output of a spare terminating board.

As it has been observed that the design of known equipment or exchanges are such that some failures may not be detected, such as failures in the connections provided for the replacement of a working link by a protecting link or a connection for replacing an active terminating board by a spare terminating board, in a particular embodiment, the invention takes advantage of the switching devices, more particularly the 2×2 switches or similar to test the continuity of the connection between the links and the spare terminating boards, a test function being incorporated in such spare terminating boards.

In known equipment, either the control and switching of the failing links, or the control and switching of the failing boards are not centralized. This causes interchanging messages over different boards to control and perform the switching function. This exchange of messages entails a waste of time and the risk of loosing data.

In order to overcome this drawback, in an embodiment, the protecting controls are centralized. Therefore, with this architecture, it is possible to minimize the time required for replacing automatically a failed terminating board by a spare terminating board and to minimize the time for replacing a failed working link by a protecting link. Consequently, the risk of loosing data is minimized.

Preferably, in order to allow a replacement of the switching devices, such as the 2×2 switches, without interrupting the traffic and to simplify the manufacture and the use of such exchanges, the 2×2 switches are installed on a panel, called an applique, together with the corresponding control means for these switches.

For the same reason of simplicity of manufacture and use, the wires or fibers connecting the switching devices to the terminating board are preferably installed on a single panel which will be called here a back panel.

The terminating boards are also preferably installed on a common terminating panel.

In an embodiment, the protection of the terminating boards is performed from the applique panel and controlled from the terminating panel and the control operation for protecting the links is performed on the terminating panel. It is recalled here that the protection of a terminating board comprises the step of replacing the defective terminating board by a spare terminating board through an appropriate modification of the connection(s) between the switching devices and the terminating boards. By protection of the links, it is meant here that the detection of failures of a link is performed on the corresponding terminating board as well as the generation of control signals requesting the replacement of a working link by a protection link, such as the transmission of bytes $K_1$ and $K_2$ according to the ITU standard n° G.783, after which steps the final coupling to the spare link is performed.

It is recalled here that, before a repaired board can be put in service again, usually it has to be tested. This test is conventionally performed by an internal loop on the board, but the connections to the external links are not tested.

The architecture of this invention provides that a (repaired) board can be tested, including the external links, independent of other (test) boards.

Other features and advantages of the invention will appear with the description of the herein-appended drawings in which.

The example of the invention which will be described with the drawings is a switching or routing device for transmission and reception of digital data such as an equipment for transmission and reception of data according to the Internet Protocol (IP). However, it can also be used in ATM, PSTN, or STM networks.

Figure 1:
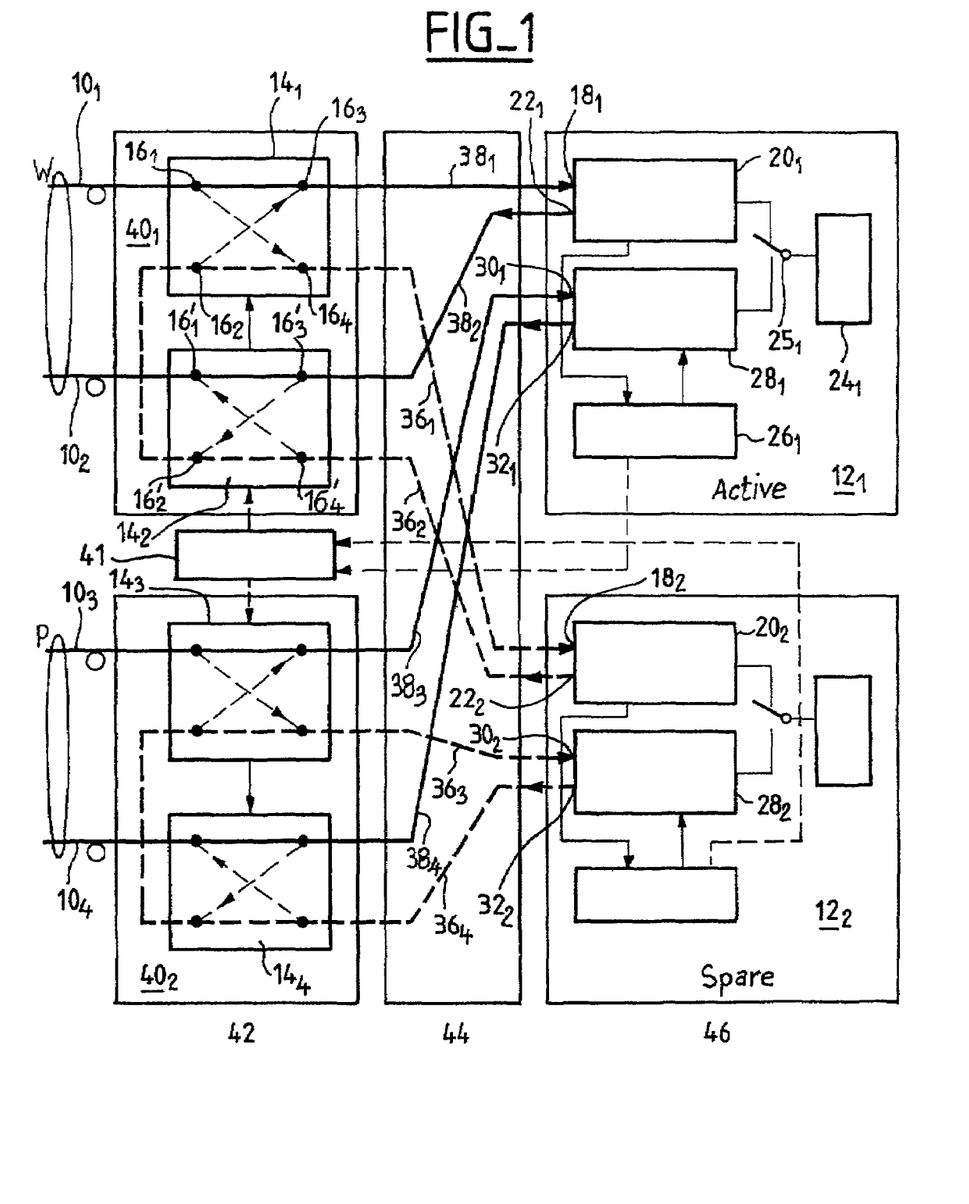
FIG. 1 represents schematically an exchange according to the invention with one working link, one protecting link, one terminating board and one spare board.

In the example of FIG. 1, the transmission of data is performed through bi-directional links, each bi-directional link comprising an incoming link and an outgoing link. Each incoming link is coupled to an input, for instance $10_1$, and each outgoing link is coupled to an output, for instance $10_2$. In FIG. 1, each of these bi-directional links is represented as two separate lines, for instance two optical fibres, but they may as well be integrated in one conductor or one fiber. In FIG. 1, respective couples of such incoming and outgoing links are respectively denoted as W and P.

Link W is hereafter called a "working" link, which, in a 1:1 protection configuration is always coupled to a "protection" link. In a later paragraph, the more general case of 1:n protection will be dealt with, with which it is meant that one protection link is provided for n working links.

The input $10_1$ is coupled to a terminating board $12_1$ and the output $10_2$ transmits data from the terminating board $12_1$ to the other end of the link (not shown), for instance comprising an equipment similar to the one represented on FIG. 1.

To the working link W is associated a protecting link P comprising also a forward link coupled to another input $10_3$ and a return link coupled to another output $10_4$ Both links may again be integrated into one conductor. This protecting link P replaces the working link W in case of failure of the latter.

When the working link W is operating correctly, the protecting link P is used to transmit and receive signalling data such as the bytes $K_1$ and $K_2$. These are used for requesting protection of the link, i.e. for requesting a replacement of the working link by the protecting link, for instance in case of failure of the working link.

According to the preferred embodiment of the invention, to each line end is associated a 2×2 switch and all the 2×2 switches are coupled and controlled in such a way that, in case of failure of a terminating board $12_1$, this active terminating board $12_1$ is replaced by a spare terminating board $12_2$. Preferably, the 2×2 switches are used for testing, from the spare terminating board, the reserved link(s) which is (are) used only in case of replacement of the active terminating board by the spare terminating board $12_2$.

More precisely, as shown on FIG. 1, to the input end $10_1$ of link W is associated a 2×2 optical switch $14_1$ comprising four terminals $16_1$, $16_2$, $16_3$ and $16_4$, and second control means ($26_1$ and 41) for modifying the connection between these terminals. The switch $14_1$ has two operating positions: in the first operating position, the terminal $16_1$ is coupled to the terminal $16_3$, and the terminal $16_2$ is coupled to the terminal $16_4$, as shown in thick full and broken lines respectively, and in the second operating position, the terminal $16_1$ is coupled to the terminal $16_4$, and terminal $16_2$ is coupled to terminal $16_3$, as is shown by the thin broken lines.

In the operating mode represented on FIG. 1 with thick lines, the connections $16_1$–$16_3$ and $16_2$–$16_4$ are used. In the operating mode represented on FIG. 2, the connections which are used are $16_1$–$16_4$ and $16_2$–$16_3$.

In a similar way, a 2×2 switch $14_2$ is associated to the output end $10_2$ of link W, and two respective 2×2 switches $14_3$ and $14_4$ are respectively associated to input $10_3$ and output $10_4$ coupled to link P.

In FIG. 1, the terminal $16_3$ of switch $14_1$ is coupled to an input $18_1$ of a detection circuit $20_1$ of the active terminating board $12_1$. One output $22_1$ of circuit $20_1$ is coupled to the terminal $16'_3$ of switch $14_2$. The function of circuit $20_1$ is, on one hand, to detect signal failures (SF) and signal degradation (SD) of the data received from input $10_1$ and, on the other hand, to transmit the received data to a data transmission/reception circuit $24_1$. When a signal failure or a signal degradation is detected by circuit $20_1$, this SF or SD information is transmitted to a controller $26_1$ on the terminating board $12_1$ and this controller $26_1$ provides a control signal to a request circuit $28_1$ of the same board $12_1$. This circuit $28_1$ generates $K_1$ and $K_2$ requests which are the standardized bytes used for requesting the replacement of a working link by a protection link. These $K_1$ and $K_2$ bytes are transmitted through the protection link P as indicated by the thick black lines between circuits $28_1$ and input $10_3$ and output $10_4$. The request circuit $28_1$ has therefore one input $30_1$ connected to the third terminal of switch $14_3$ and one output $32_1$ connected to the third terminal of switch $14_4$.

Figure 2:
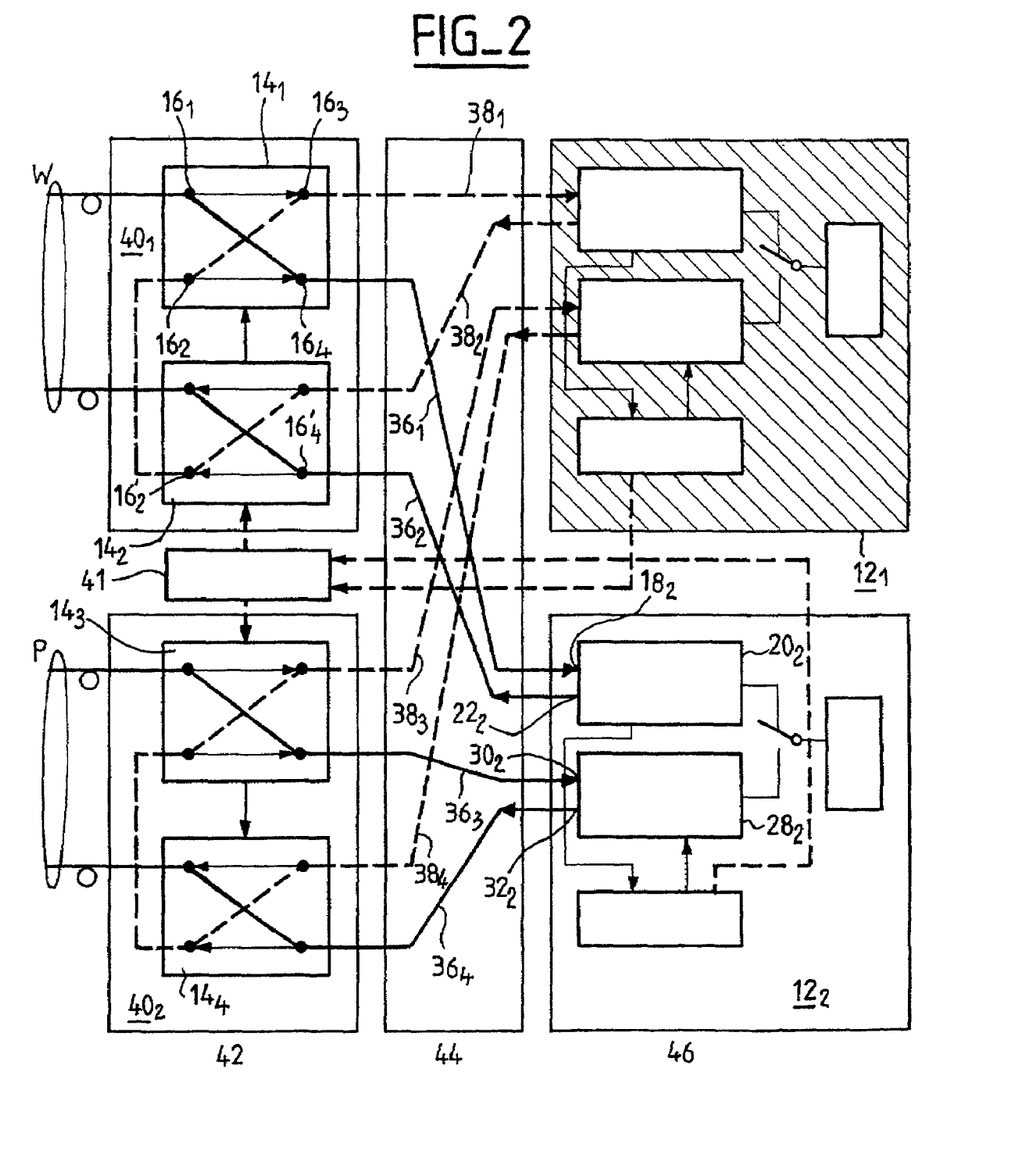
FIG. 2 represents the same exchange as the one shown on FIG. 1 but in a different operating mode.

In the operating mode represented on FIG. 1, the terminals $16_2$ ($16'_2$) and $16_4$ ($16'_4$) of switch $14_1$ ($14_2$), and the corresponding terminals of switches $14_3$ and $14_4$ are not used for transmitting data or signalling. However, these terminals, as shown on FIG. 2, are used for transporting data and signalling when the spare board $12_2$ becomes active and the board $12_1$ becomes a spare board. Moreover, the terminals $16_2, 16_4, 16'_2$ and $16'_4$ are used for testing the connections to the board $12_2$. For this purpose, respective terminals $16_4$ and $16'_4$ of respective switches $14_1$ and $14_2$ are coupled to respective terminals $18_2$ and $22_2$, of detection circuit $20_2$ of terminating board $12_2$. Similarly, the fourth terminals of switches $14_3$ and $14_4$ are coupled to the terminals $30_2$ and $32_2$ of request circuit $28_2$ of the terminal board $12_2$. Circuits $20_2$ and $28_2$ of the terminating board $12_2$ have the same functions as circuits $20_1$ and $28_1$ of the terminating board $12_1$.

For the testing: of line $36_1$ between terminal $16_4$ of switch $14_1$ and input terminal $18_2$ of circuit $20_2$; of line $36_2$ between terminal $16'_4$ of switch $14_2$ and input terminal $22_2$ of circuit $20_2$; of line $36_3$, between the fourth terminal of switch $14_3$ and terminal $30_2$ of circuit $28_2$; and of line $36_4$, between the fourth terminal of switch $14_4$ and input terminal $32_2$ of circuit $28_2$, it is necessary that lines $36_1$ and $36_2$ are inside a closed loop and that lines $36_3$ and $36_4$ are also in a closed loop. For this purpose, terminal $16'_2$ of switch $14_2$ is coupled to terminal $16_2$ of switch $14_1$ and, in the same way, the second terminal of switch $14_4$ is coupled to the second terminal of switch $14_3$, as can be observed from FIG. 2.

Therefore, the testing of the continuity of lines $36_1$ and $36_2$ is realized from detection circuit $20_2$ of spare terminating board $12_2$ and the testing of continuity of lines $36_3$ and $36_4$ is realized by request circuit $28_2$ of the spare terminating board $12_2$.

In FIG. 1 and FIG. 2, the lines which are used for transmitting data and signalling are represented with black thick full lines and the lines which are tested, and not used for transporting data or signalling, are represented with thick dotted lines.

The 2×2 switches $14_1$ and $14_2$, which, in an embodiment where W and P present optical fibres consist of optical switches, are installed on a board $40_1$. In the same way, the optical switches $14_3$ and $14_4$ are installed on a common board $40_2$. The boards $40_1$ and $40_2$ are installed on a panel 42 called here an "applique" panel. The active connections or couplings $38_1, 38_2, 38_3$ and $38_4$ to the board $12_1$ and the reserved connections $36_1$ to $36_4$ are realized on a panel 44 called here a "back panel". The terminating boards $12_1, 12_2$ are installed on a "terminating panel" 46.

With this structure, each applique board $40_1, 40_2$ can be replaced easily. In the same way, each terminating board $12_1, 12_2$ can be replaced easily.

The exchanges of functions between boards $40_1$ and $40_2$, and between boards $12_1$ and $12_2$ are done automatically. More particularly, when a fault is detected by controller $26_1$ on the active board $12_1$, the controller $26_1$ of the board sends a command signal to a priority logic circuit 41 between boards $40_1$ and $40_2$ in order to modify (switch over) the connections or couplings of the switches $14_1, 14_2$ and $14_3, 14_4$. With this modification of the connections, which is represented on FIG. 2, the terminating board $12_2$, which was previously a spare board, becomes an active board and, reciprocally, the terminating board $12_1$, which was previously active, becomes a spare board. With these new connections or couplings, the data and the signalling are transmitted by the board $12_2$, and the board $12_1$ is used to check the connections $38_1$ to $38_4$ which, on FIG. 2, are represented with thick dotted lines, the connections $36_1$ to $36_4$ being represented with black thick lines on this FIG. 2.

Preferably, the automatic protection switching, which replaces automatically a defective working link by a protecting link, is performed only on the terminating board $12_1$ or $12_2$ by means of circuits $28_1$ and $26_1$, together constituting the first control means. The detection of defects is performed by detection circuit $20_1$, and the request for switching over from working link to protecting link is performed with the first control means, constituting of $28_1$ and $26_1$, all being positioned on the same board. Consequently, the time for controlling the switch over can be minimized due to the fact that there is no delay to send the necessary control signals since these circuits are all on the same board and are not interfacing with other processors. This decentralised approach further adds to the speed.

When a new terminating board $12_1$ will replace a previously defective board, while board $12_2$ has already taken over, the connections $38_1, 38_2, 38_3$ and $38_4$, and the circuits $20_1$ and $28_1$ of this new board $12_1$ are used to check the correct operation of this new board. This checking operation may be performed in a minimized time due to the implementation of the checking circuit on the terminating board $12_1$ itself, as is shown in FIG. 2.

The minimization of the replacement time and of the checking time is, of course, favorable to the minimization of data losses.

The exchange according to the invention may be used either with 1:1 or with 1+1 operation. As known, a 1:1 operation is such that the data are transmitted on the working link only and not on the protecting link. In the 1+1 operation, the data are transmitted on both links and, on the reception side, the data which are received with the best quality are selected.

In case of automatic protection switching, part of the functions of circuits $20_1$ and $28_1$ are exchanged and a switch $25_1$ connects the data transmission circuit $24_1$ from circuit $20_1$ to circuit $28_1$.

The example which has been described with FIG. 1 and FIG. 2 is the simplest example of embodiment of the invention with one protection link for one working link and one spare board for one active terminating board. More generally, it is possible to select, at will, the number of protecting links and the number of working links; the number of active and spare terminating boards may also be selected at will and the protection ratios of the links and of the terminating boards may be chosen independently from each other.

Figure 3:
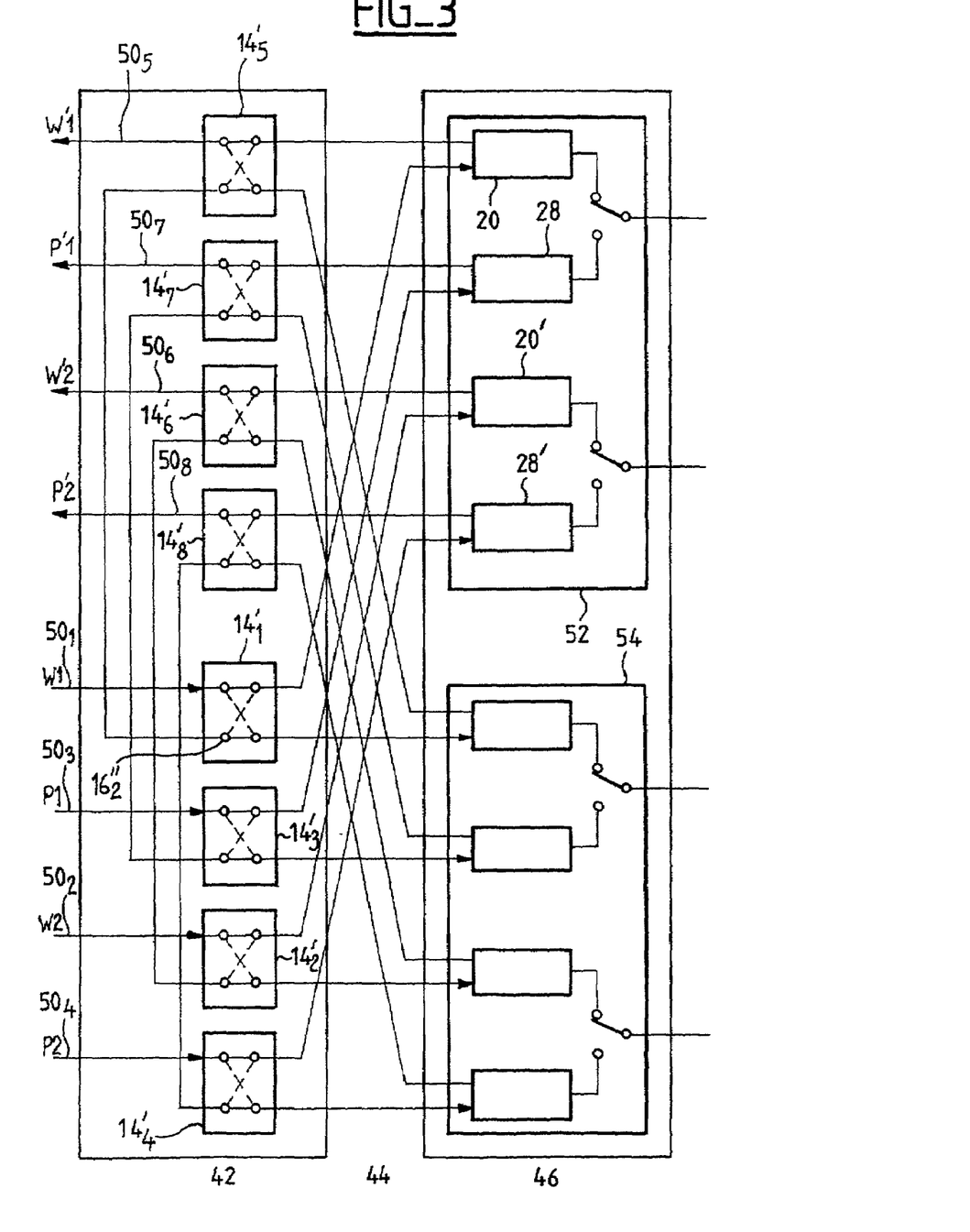
FIGS. 3, 4, 5, 5a, 6 and 7 are schematic drawings representing other embodiments of the invention.

In the embodiment represented on FIG. 3, on the applique board 42 two working links and two protecting links are provided. In other words, to each working link is associated a protecting link. The forward working lines $W_1, W_2$ are connected to inputs $50_1$ and $50_2$, and the corresponding forward protecting lines $P_1, P_2$ are connected to inputs $50_3$ and $50_4$. The return working lines $W'_1, W'_2$ are connected to outputs $50_5$ and $50_6$, and the corresponding return protecting lines $P'_1, P'_2$ are connected to outputs $50_7$ and $50_8$.

The terminating panel 46 is provided with an active terminating board 52 and an identical spare terminating board 54.

Each terminating board 52, 54 is provided with a number of circuits 20, 28 equal to the number of working and protecting links. More precisely, the active terminating board 52 is provided with a first data or detection circuit 20 for the working link ($W_1, W_1$), a first request circuit 28 for the protecting link ($P_1$, $P'_1$), a second data circuit 20' for the second working link ($W_2$, $W'_2$), and a second request circuit 28' for the connection and protection of the second protecting link ($P_2$, $P'_2$).

The 2×2 switches $14'_i$ of the applique panel 42 have their terminals connected in a similar way as terminals $16_1$, $16_2$, $16_3$ and $16_4$ in FIG. 1 and FIG. 2, more particularly the second terminal $16'_2$ of the 2×2 switch $14'_1$ is connected to the corresponding terminal of the switch $14'_5$ on the return line $W'_1$.

For the rest, the operation of the exchange represented on FIG. 3 is the same as the operation of the exchange described with FIG. 1 and FIG. 2.

Figure 4:
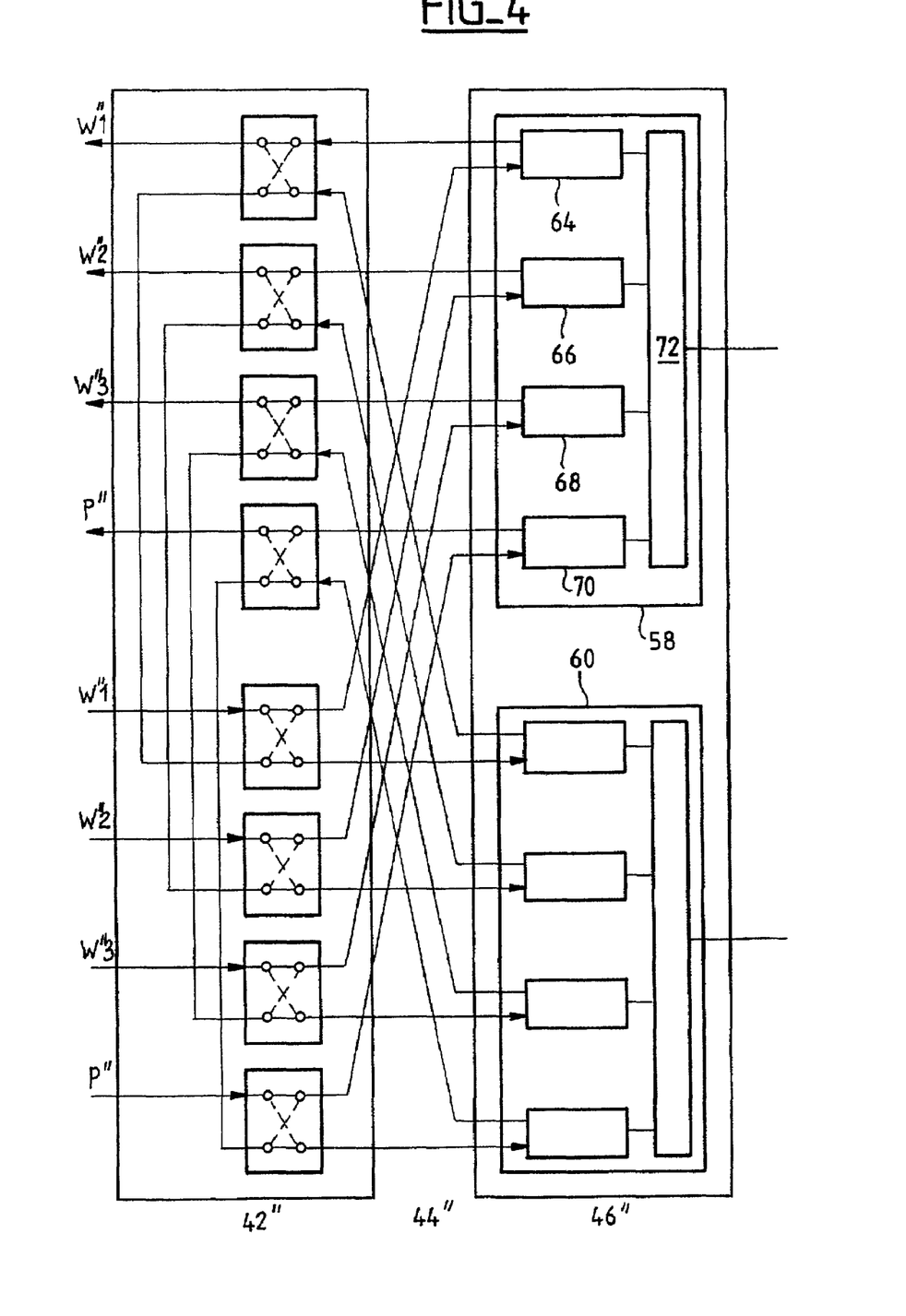

In the embodiment represented on FIG. 4, only one protecting link P''' is provided for three working links $W'_1$, $W'_2$ and $W'_3$. On the terminating panel 46''', one spare board is provided for one active board.

Therefore, on each terminating board 58, 60, the number of automatic protection circuits (APS) corresponding to circuits $20_1$ (data or detection) and $28_1$ (request) of FIG. 1 is four: one for each working link and one for the protecting link. These APS circuits have the references respectively 64, 66, 68 and 70. The circuits 64, 66 and 68 are data circuits (similar to circuit $20_1$ of FIG. 1) and the circuit 70 is a request circuit (similar to circuit $28_1$ of FIG. 1). In addition, a common processor, similar to $26_1$ is also present on the termination board, although it is not represented in the figure in order not to overload it. To the data circuits 64, 66, 68 and 70 correspond a switch 72 having a similar function as switch $25_1$ of FIG. 1, i.e. the switch 72 normally provides the transmission of the data through the circuits 64, 66 and 68 but when a working link is replaced by the protecting link P''', the switch 72 transmits the data through the circuit 70 for the working link which has been replaced by the protecting link.

Due to the fact that there is only one protecting link for three working links, it is necessary to provide priority rules for the boards 58 and 60 in order to determine which working link must be protected when more than one working link is defective.

The connections between the 2×2 switches and between the applique panel and the terminating panel are similar to those described with FIG. 1 and FIG. 3.

Although on FIG. 4 the number of working links is three, it is clear that this number of working links may have any value, for instance up to seven as provided by the ITU standard n° G.783.

As already mentioned, it is not absolutely necessary that an automatic protection switching be provided. In other words, the number of protecting links may be zero. An example of such embodiment is represented on FIG. 5. In this embodiment, one spare terminating board 80 is provided for three active terminating boards 82, 84, 86.

Figure 5:
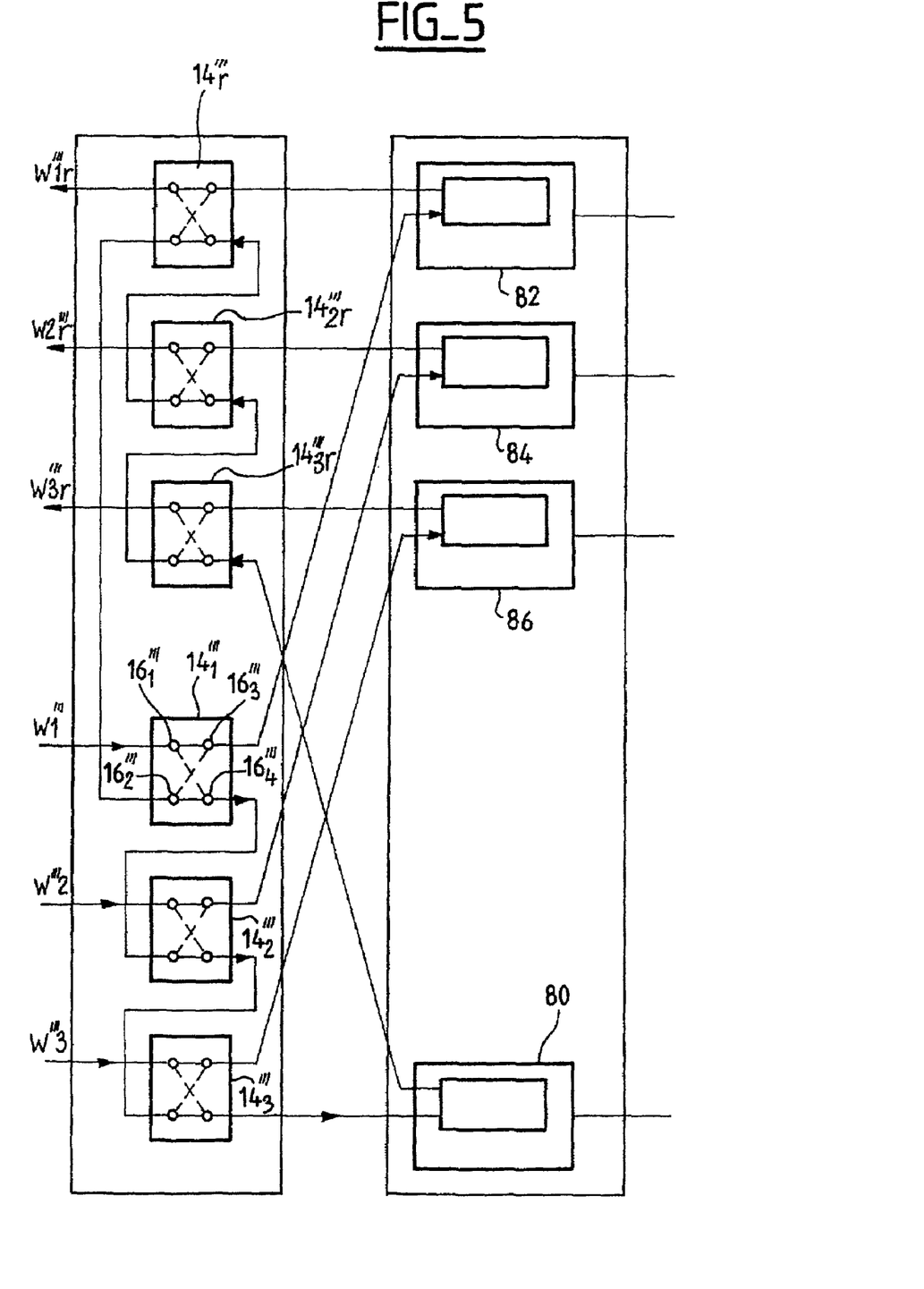

Due to the absence of a protecting link, the connection between the 2×2 switches is slightly different from the connection represented on FIG. 1 to FIG. 4. More precisely, on the forward lines $W'''_1$, $W'''_2$, $W'''_3$, the fourth terminal $16'''_4$ of switch $14'''_1$ is coupled to the second terminal $16_2$ of switch $14'''_2$ and the fourth terminal of said switch $14'''_2$ is coupled to the second terminal of switch $14'''_3$. In a similar way, the switches $14'''_{1r}, 14'''_{2r}, 14'''_{3r}$ of the return line $W'_1$, $W'_2$ and $W'_3$ are connected in series, i.e. in the second terminal of switch $14'''_{3r}$ is connected to the fourth terminal of switch $14'''_{2r}$, and second terminal of switch $14'''_{2r}$ is connected to the fourth terminal of switch $14'''_{1r}$. The second terminal of switch $14'''_{1r}$ is connected to the second terminal $16'''_2$ of switch $14'''_1$.

The third terminals of switches $14'''_1$ and $14'''_{1r}$ are connected to the input and output terminals of the terminating board 82. In the same way, the third terminals of switches $14'''_2$ and $14'''_{2r}$ are connected to the input and output terminals of terminating board 84 and the third terminals of switches $14'''_3$ and $14'''_{3r}$ are connected to the input and output terminals of terminating board 86. The input and output terminals of the spare terminating board 80 are connected to the fourth terminals of, respectively, the switches $14'''_3$ and $14'''_{3r}$.

Figure 5A:
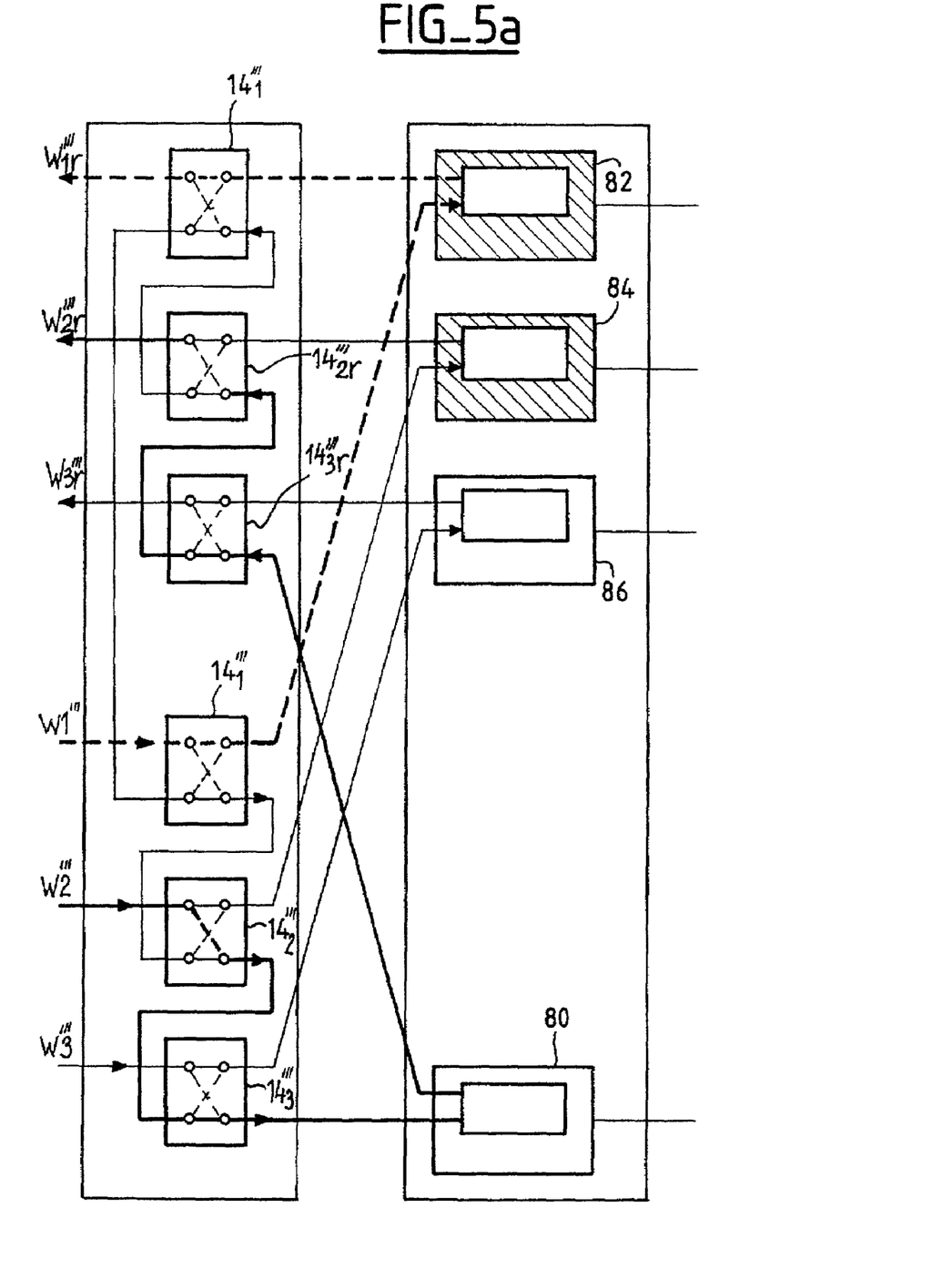

FIG. 5a shows the operation of the device of FIG. 5 in case of failures of terminating boards 82 and 84.

In this case, the 2×2 switches $14'''_{2r}$ and $14'''_2$ are controlled in order that the link $W'''_2$, $W'''_{2r}$ be coupled to the spare terminating board 80.

In spite of the failure of terminating board 82, the corresponding 2×2 switches $14'''_1$ and $14'''_{1r}$ remain in their previous position. In other words, in this case, the second defective terminating board is not immediately automatically replaced because of the lack of extra-spare boards. In this situation, the control circuits are such that they establish a priority table to select the link which will be protected in case of failure of a number of active boards which is greater than the number of spare board (s).

Figure 6:
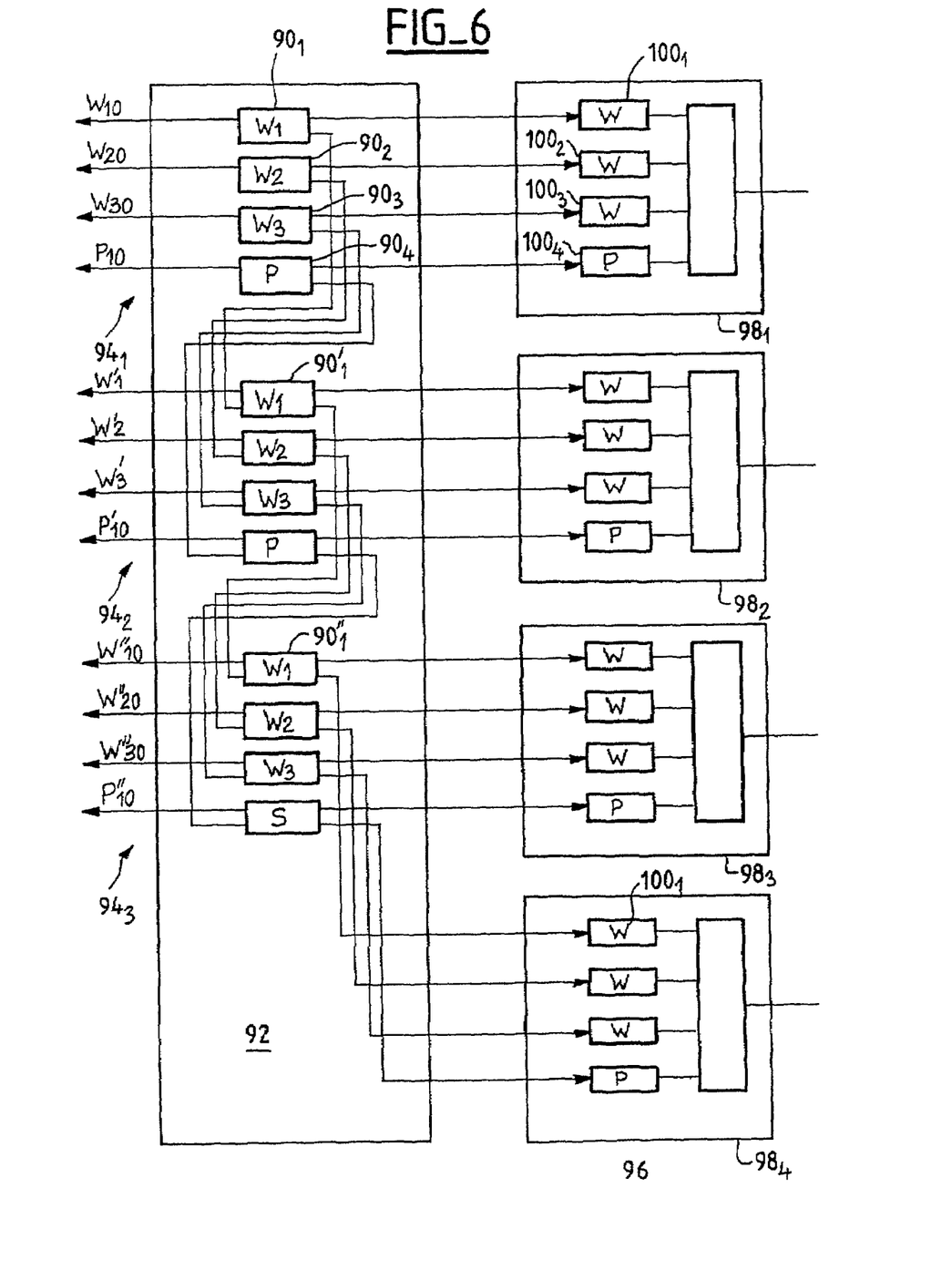

Reference will now be made to FIG. 6 which represents an exchange according to the invention wherein one protecting link is provided for three working links and one spare terminating board is provided for three active terminating boards.

In order to simplify the representation, the forward and return lines of each link have been represented by a single line. Consequently, the pair of 2×2 switches which are associated, respectively, to the forward line and the return line have been represented by a single block $90_i$. For instance, the block $90_1$ of FIG. 6 which is associated to the end of the link $W_{10}$ comprises two 2×2 switches which are in fact connected like the switches $14'''_1$ and $14'''_{1r}$ represented on FIG. 5.

This exchange comprises, on the applique panel 92, three identical sets or boards $94_1$, $94_2$ and $94_3$ of equipment each having pairs of 2×2 switches $90_i$ and the corresponding control circuits for the protection of the equipment on the terminating panel 96.

The board $94_1$ is coupled to three working links $W_{10}, W_{20}, W_{30}$ and one protecting link $P_{10}$ and includes four pairs of 2×2 switches, respectively, $90_1, 90_2, 90_3$ and $90_4$, i.e. eight 2×2 optical switches. Similary, the board $94_2$ is coupled to three working links $W'_{10}, W'_{20}, W'_{30}$ and one protecting link $P'_{10}$ and the board $94_3$ is coupled to links $W''_{10}, W''_{20}, W''_{30}$ and $P''_{10}$.

On the terminating panel 96, four terminating boards are provided, respectively, $98_1, 98_2, 98_3$ and $98_4$, the boards $98_1$, $98_2$ and $98_3$ being active boards and the board $98_4$ being a spare board.

Each of these terminating boards comprises automatic protection switching circuits like those of reference $20_1$ and $28_1$ and $26_1$ as described with FIG. 1. The automatic protection switching circuits $100_1, 100_2, 100_3$ and $100_4$ are associated with the links, respectively, $W_{10}, W_{20}, W_{30}$ and $P_{10}$.

As the terminating panel 96 comprises only one spare board $98_4$ for protecting the three sets of working links $W_{10}$, $W_{20}, W_{30}$, it is necessary to couple in series the switches of the boards $94_1, 94_2$ and $94_3$. More precisely, the switches $90_i$ of board $94_1$ are coupled in series with switches $90_1$ of the two other boards 94₂ and 94₃ in order that all these sets of switches 90₁ be coupled to the protection circuits 100ᵢ of the spare board 98₄.

The series connection or coupling is similar to the one described with FIG. 5.

The operation of this exchange represented on FIG. 6 is similar to the operation of the exchanges described with FIG. 4 and FIG. 5.

It is to be noted that, like for the embodiment of FIG. 5, it is necessary to provide priority rules for the protection of the sets of links associated to boards 94₁, 94₂ and 94₃, because there is only one spare board 98₄ for the three active boards 98₁, 98₂ and 98₃ and in case of failure of more than one active board, the priority order must automatically determine which of the link sets will be selected for protection.

Although in the embodiment described with FIG. 6, one protecting link is provided for N working links and one spare board is provided for the same number N of active boards, it is possible to select independently the number n of working links which will be protected by one protecting link and the number m of active boards which will be protected by one spare board.

Figure 7:
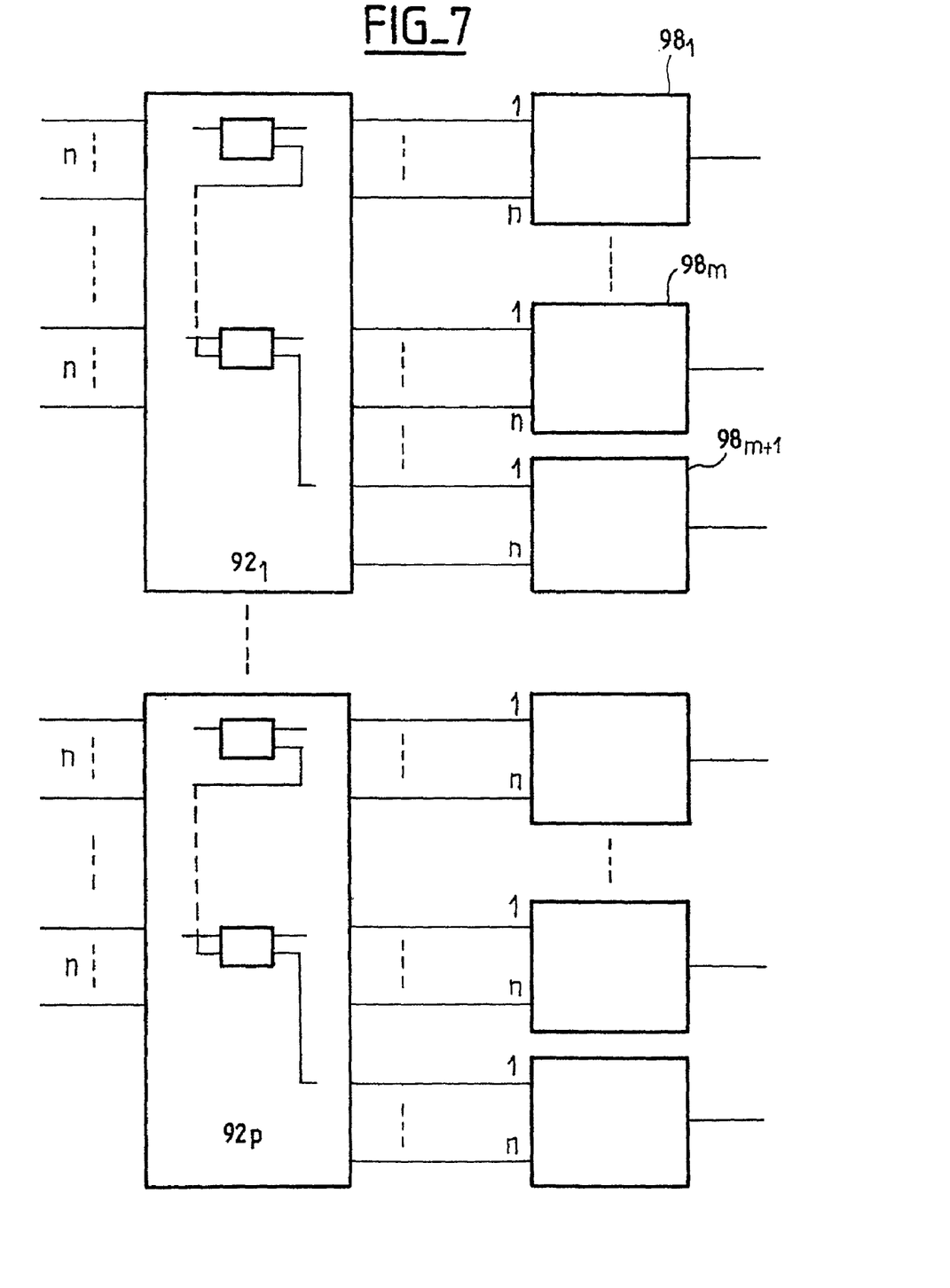

FIG. 7 shows the general configuration of an exchange wherein p applique boards 92₁, . . . , 92ₚ are provided. On each applique board 92₁, are coupled m sets of n links and to these m sets of n links are associated m active boards 98₁, . . . , 98ₘ and one spare board 98ₘ₊₁.

The number of 2×2 switches of the p applique panels may be easily calculated: to each link, corresponds two 2×2 optical switches; therefore, the total number of switches is 2×n×m×p.

According to the present state of the art, the maximum value of n may be 8, the maximum value of m may be 7 and the maximum value of p may be 3. Of course, these maximum values are just given as an example.

What is claimed is:

1. An apparatus for the transmission and the reception of data comprising:
   a plurality of links, each link comprising an input and an output, and each input and each output is associated a respective 2×2 switching device,
   at least one active terminating board coupled to each input and output associated with a link for transmitting data,
   at least one terminating board that is able to replace a defective active terminating board,
   the at least one terminating board comprising means to test the quality of the link to which it is associated and to compare said quality to a predetermined criteria and to generate a control signal to first control means of said terminating board, wherein the first control means replaces the defective link by another link if said quality does not comply with the predetermined criteria, and
   second control means coupled to the at least one active and spare terminating boards to modify the operation of at least one of said switching devices to replace a failed active terminating board by the at least one spare terminating board,
   wherein one terminal of each switching device is coupled to the corresponding input or output of a link, one terminal is coupled to the at least one active terminating board, one terminal is coupled to another switching device and the remaining terminal is coupled to either another switching device or to the at least one spare terminating board.

2. The apparatus according to claim 1, wherein the switching device associated to an input of a link and the switching device associated to the corresponding output of the link are coupled to each other and wherein the at least one spare terminating board comprises a device to test the continuity of the coupling of these switching devices to the at least one spare terminating board.

3. The apparatus according to claim 1, wherein the switching devices are of the optical type.

4. The apparatus according to claim 1, wherein the switching devices are disposed on an applique, the at least one active and spare terminating boards are disposed on a terminating panel and the coupling between the switching devices and the at least one active and spare is disposed on a back panel.

5. The apparatus according to claim 1, wherein one spare terminating board is provided for at least two active terminating boards and the switching devices for the inputs and outputs of the links are connected in series towards the spare terminating board.

6. The apparatus according to claim 5, wherein the second control means for the switching devices establishes a priority among the active terminating boards when at least two active terminating boards fail.

7. The apparatus according to claim 1 wherein, in case of failure of an active terminating board, the second control means connects a failed active terminating board as a spare terminating board.

8. The apparatus according to claim 7 wherein, after replacement of a failed terminating board, the switching devices are connected to allow the control of the correct operation of the replaced terminating board.

9. The apparatus according to claim 1, wherein all links are adapted to carry data with different priorities and wherein the second control means decides, in case of link failure and/or terminating board failure, that the link carrying the data having the highest priority will take over.

10. A method for controlling the operation of an apparatus for the transmission and reception of data, said apparatus comprising:
    a plurality of links, each link comprising an input and an output, and each input and each output is associated a respective 2×2 switching device,
    at least one active terminating board coupled to each input and output associated with a link for transmitting data,
    at least one spare terminating board that is able to replace a defective active terminating board,
    the at least one terminating board comprising means to test the quality of the link to which it is associated and to compare said quality to a predetermined criteria and to generate a control signal to first control means of said terminating board, wherein the first control means replaces the defective link by another link if said quality does not comply with the predetermined criteria, and
    second control means coupled to the at least one active and spare terminating boards for controlling the replacement of a failed active terminating board by a spare terminating board,
    wherein one terminal of each switching device switch is coupled to the corresponding input or output of a link, one terminal is coupled to the at least one active terminating board, one terminal is coupled to another switching device and the remaining terminal is coupled to either another switching device or to the at least one spare terminating board,
    wherein said method comprises controlling the switching devices with the second control means to arrange their switch settings and couplings to replace a failed active terminating board by a spare terminating board.

11. The method according to claim 10, wherein the method further comprises coupling the switching device associated to an input of a link and the switching device associated to the corresponding output of the link and testing the continuity of the coupling of these switching devices device to the at least one spare terminating board.

12. The method according to claim 10, wherein the method further comprises installing the switching devices and their control means on a applique panel, installing the at least one active and spare terminating boards on a terminating panel and coupling the switching devices and the terminating boards together using a back panel.

13. The method according to claim 10, wherein the method further comprises providing one spare terminating board for at least two active terminating boards and connecting in series the switching devices for the inputs and outputs of the links towards the spare terminating board.

14. The method according to claim 13, wherein a priority is established by the second control means among the active terminating boards when at least two active terminating boards fail.

15. The method according to of claim 10 wherein, in case of failure of an active terminating board, the method further comprises controlling the switching devices to connect the failed active terminating board as a spare terminating board.

16. The method according to claim 15 wherein, after replacement of a failed terminating board, the method further comprises connecting the switching devices to control of the correct operation of the replaced terminating board.

17. The method according to claim 11, wherein all links are used for carrying data with different priorities and wherein, in case of a link failure and/or a terminating board failure, the method further comprises that the link carrying the data having a highest priority will take over.

* * * * *